United States Patent
Liao et al.

(10) Patent No.: US 8,680,196 B2
(45) Date of Patent: Mar. 25, 2014

(54) HALOGEN-FREE AND PHOSPHORUS-FREE RESIN FORMULATION AND COMPOSITE MATERIALS PREPARED THEREFROM

(75) Inventors: Lu-Shih Liao, Taichung (TW); Kuo-Chan Chiou, Tainan (TW)

(73) Assignee: Industrial Technology Research Institute, Hsinchu County (TW)

( * ) Notice: Subject to any disclaimer, the term of this patent is extended or adjusted under 35 U.S.C. 154(b) by 40 days.

(21) Appl. No.: 13/078,973

(22) Filed: Apr. 3, 2011

(65) Prior Publication Data

US 2012/0129413 A1    May 24, 2012

(30) Foreign Application Priority Data

Nov. 23, 2010    (TW) ............................... 99140317 A

(51) Int. Cl.
| | | |
|---|---|---|
| *B32B 27/04* | (2006.01) | |
| *B05D 3/02* | (2006.01) | |
| *C08L 37/00* | (2006.01) | |
| *C08F 8/00* | (2006.01) | |

(52) U.S. Cl.
USPC ........... 524/514; 525/131; 442/136; 442/147; 427/385.5

(58) Field of Classification Search
None
See application file for complete search history.

(56) References Cited

U.S. PATENT DOCUMENTS

| 5,047,477 | A * | 9/1991 | Taniuchi et al. | ............... 525/123 |
| 2005/0148696 | A1 | 7/2005 | Hsiao et al. | |
| 2009/0292062 | A1 | 11/2009 | He et al. | |
| 2010/0163783 | A1 * | 7/2010 | Fung et al. | ...................... 252/73 |

FOREIGN PATENT DOCUMENTS

| JP | 2003-138241 A | 5/2003 |
| JP | 2004-217861 A | 8/2004 |
| JP | 2004-217862 A | 8/2004 |
| TW | I223975 | 11/2004 |
| TW | 200520639 A | 6/2005 |
| TW | 201026174 A | 7/2010 |
| WO | 03/048251 A1 | 6/2003 |

OTHER PUBLICATIONS

Office Action (Notification of Examination Opinion) issued by the Taiwan Intellectual Property Office on Apr. 23, 2013, for the above-referenced application's counterpart application in Taiwan (Application No. 099140317).

* cited by examiner

*Primary Examiner* — Jennifer A Chriss
*Assistant Examiner* — Camie Thompson
(74) *Attorney, Agent, or Firm* — Pai Patent & Trademark Law Firm; Chao-Chang David Pai

(57) ABSTRACT

A halogen-free and phosphorus-free resin formulation, prepared by the following method, is provided. The method includes mixing a carboxy anhydride derivative, diisocyanate, a styrene maleic anhydride (SMA) copolymer derivative and a solvent to form a mixture, and heating the mixture to form a resin formulation. The disclosure also provides a halogen-free and phosphorus-free composite material with a low dielectric constant and flame resistance prepared from the resin formulation.

8 Claims, No Drawings

HALOGEN-FREE AND PHOSPHORUS-FREE RESIN FORMULATION AND COMPOSITE MATERIALS PREPARED THEREFROM

CROSS REFERENCE TO RELATED APPLICATIONS

This application claims priority of Taiwan Patent Application No. 99140317, filed on Nov. 23, 2010, the entirety of which is incorporated by reference herein.

BACKGROUND

1. Field

The disclosure relates to a resin formulation, and more particularly to a halogen-free and phosphorus-free resin formulation and a halogen-free and phosphorus-free composite material with a low dielectric constant and flame resistance prepared from the resin formulation.

2. Description of the Related Art

In a halogen-free material formulation composition, generally, phosphide is selected as a flame retardant, which replaces the halogen compound in the material formulation composition. But if the phosphorus content is too high, it will hinder heat resistance. Therefore, a formulation composition with an appropriate amount of phosphorus content with aluminum hydroxide added thereto is selected, so that the UL-94 V0 flame resistance requirement may be met. Currently, even for a halogen-free and phosphorus-free formulation composition with high flame resistance, aluminum hydroxide is added thereto so that the UL-94 V0 flame resistance requirement may be met. Currently, epoxy resin is the main type of heat-resistant material used when selecting organic substrate materials with high flame resistance, in addition to BT (Bismaleimide Triazine) resin, wherein the Tg point of epoxy resin is measured at around 180° C. by TMA measurement.

BRIEF SUMMARY

One embodiment provides a halogen-free and phosphorus-free resin formulation prepared by mixing a carboxy anhydride derivative, diisocyanate, a styrene maleic anhydride (SMA) copolymer derivative and a solvent to form a mixture, and heating the mixture to form a resin formulation.

One embodiment provides a halogen-free and phosphorus-free composite material with a low dielectric constant and flame resistance prepared by providing the disclosed halogen-free and phosphorus-free resin formulation, impregnating a fiber with the resin formulation, and hardening the fiber by heating to prepare a halogen-free and phosphorus-free composite material with a low dielectric constant and flame resistance.

The disclosed composite material is an environmentally friendly (halogen-free and phosphorus-free) material with high heat resistance and a low dielectric constant mainly synthesized from raw materials such as carboxy anhydride derivative, diisocyanate such as methylene diphenyl diisocyanate (MDI), toluene diisocyanate (TDI) or isophorone diisocyanate (IPDI), and a styrene maleic anhydride (SMA) copolymer derivative. The composite material meets the UL-94 V0 flame resistance requirement, which can be apply to flame resistance materials, such as high-heat-resistant and high-frequency substrate.

In the disclosure, diisocyanate monomer with high nitrogen content (for example MDI, TDI or IPDI), carboxy anhydride monomer (for example trimellitic anhydride (TMA)) and resin (for example SMA copolymer) with proper ratios are mixed and reacted under an appropriate temperature to synthesize the halogen-free and phosphorus-free composite material with a low dielectric constant and flame resistance.

A detailed description is given in the following embodiments.

DETAILED DESCRIPTION

One embodiment provides a halogen-free and phosphorus-free resin formulation, prepared by the following method. First, carboxy anhydride derivative, diisocyanate, a styrene maleic anhydride (SMA) copolymer derivative and a solvent are mixed to form a mixture. The mixture is then heated to form a resin formulation.

The carboxy anhydride derivative is represented by the following formula.

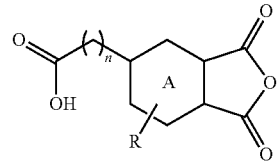

In the formula, A may be benzene or cyclohexane, R may be H, $CH_3$ or COOH, and n may be 0-8. In an embodiment, the carboxy anhydride derivative is preferably trimellitic anhydride (TMA).

The diisocyanate may comprise methylene diphenyl diisocyanate (MDI), toluene diisocyanate (TDI) or isophorone diisocyanate (IPDI), preferably methylene diphenyl diisocyanate (MDI).

The styrene maleic anhydride (SMA) copolymer derivative is represented by the following formula.

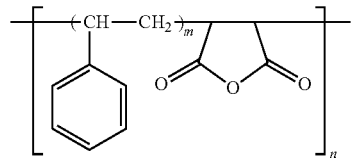

In the formula, m may be 1-7, preferably 2-3, and n may be 2-15.

The solvent may comprise dimethyl formamide (DMF), N-methyl-2-pyrrolidone (NMP) or dimethyl sulfoxide (DMSO).

In the mixture, the carboxy anhydride derivative has a weight ratio of about 10-30 parts by weight, based on 100 parts by weight of the solid content of the mixture. The diisocyanate has a weight ratio of about 10-35 parts by weight, based on 100 parts by weight of the solid content of the mixture. The styrene maleic anhydride (SMA) copolymer derivative has a weight ratio of about 35-80 parts by weight, based on 100 parts by weight of the solid content of the mixture. The solvent has a weight ratio of about 20-60 parts by weight, based on 100 parts by weight of the mixture.

The mixture is heated at about 80-140° C., preferably 95-110° C.

One embodiment provides a halogen-free and phosphorus-free composite material with a low dielectric constant and flame resistance, is prepared by the following method. First, the disclosed halogen-free and phosphorus-free resin formulation is provided. A fiber is then impregnated with the resin formulation. The fiber is then hardened by heating. A halogen-free and phosphorus-free composite material with a low dielectric constant and flame resistance is thus prepared.

The fiber may comprise glass fiber cloth or polyamide fiber.

The disclosed composite material is an environmentally friendly (halogen-free and phosphorus-free) material with high heat resistance and a low dielectric constant mainly synthesized from raw materials such as carboxy anhydride derivative, diisocyanate such as methylene diphenyl diisocyanate (MDI), toluene diisocyanate (TDI) or isophorone diisocyanate (IPDI), and a styrene maleic anhydride (SMA) copolymer derivative. The Tg point of the composite material is greater than 180° C. Also, the composite material meets the UL-94 V0 flame resistance requirement, which is advantageous for the future development of high-heat-resistant and high-frequency substrate materials.

In the disclosure, diisocyanate monomer with high nitrogen content (for example MDI, TDI or IPDI), carboxy anhydride monomer (for example trimellitic anhydride (TMA)) and resin (for example SMA copolymer) with proper ratios are mixed and reacted under an appropriate temperature to synthesize the halogen-free and phosphorus-free composite material with a low dielectric constant and flame resistance.

Example 1

Preparation of the Halogen-Free and Phosphorus-Free Composite Material with a Low Dielectric Constant and Flame Resistance (1)

100 g of trimellitic anhydride (TMA, Fu-Pao Chemical Co.), 25 g of styrene maleic anhydride (SMA3000F, Cray Valley Co.), 137.5 g of methylene diphenyl diisocyanate (MDI, Fu-Pao Chemical Co.) and 262.5 g of dimethylformamide (DMF, C-ECHO Co.) were added to a 500 ml three-neck glass reactor and uniformly stirred using a two-impeller stir bar at 80-140° C. After cooling to room temperature, a halogen-free and phosphorus-free resin formulation was prepared. A glass fiber cloth was then impregnated with the resin formulation to form a pre-preg. The pre-preg was then stacked, heated at 200° C. and pressurized for 3 hours. A halogen-free and phosphorus-free composite material with a low dielectric constant and flame resistance was prepared.

Example 2

Preparation of the Halogen-Free and Phosphorus-Free Composite Material with a Low Dielectric Constant and Flame Resistance (2)

100 g of trimellitic anhydride (TMA, Fu-Pao Chemical Co.), 100 g of styrene maleic anhydride (SMA3000F, Cray Valley Co.), 155.4 g of methylene diphenyl diisocyanate (MDI, Fu-Pao Chemical Co.) and 355.4 g of dimethylformamide (DMF, C-ECHO Co.) were added to a 500 ml three-neck glass reactor and uniformly stirred using a two-impeller stir bar at 80-140° C. After cooling to room temperature, a halogen-free and phosphorus-free resin formulation was prepared. A glass fiber cloth was then impregnated with the resin formulation to form a pre-preg. The pre-preg was then stacked, heated at 200° C. and pressurized for 3 hours. A halogen-free and phosphorus-free composite material with a low dielectric constant and flame resistance was prepared.

Example 3

Preparation of the Halogen-Free and Phosphorus-Free Composite Material with a Low Dielectric Constant and Flame Resistance (3)

100 g of trimellitic anhydride (TMA, Fu-Pao Chemical Co.), 25 g of styrene maleic anhydride (SMA3000F, Cray Valley Co.), 375 g of methylene diphenyl diisocyanate (MDI, Fu-Pao Chemical Co.) and 499.3 g of dimethylformamide (DMF, C-ECHO Co.) were added to a 500 ml three-neck glass reactor and uniformly stirred using a two-impeller stir bar at 80-140° C. After cooling to room temperature, a halogen-free and phosphorus-free resin formulation was prepared. A glass fiber cloth was then impregnated with the resin formulation to form a pre-preg. The pre-preg was then stacked, heated at 200° C. and pressurized for 3 hours. A halogen-free and phosphorus-free composite material with a low dielectric constant and flame resistance was prepared.

Example 4

Preparation of the Halogen-Free and Phosphorus-Free Composite Material with a Low Dielectric Constant and Flame Resistance (4)

100 g of trimellitic anhydride (TMA, Fu-Pao Chemical Co.), 25 g of styrene maleic anhydride (SMA3000F, Cray Valley Co.), 83.3 g of methylene diphenyl diisocyanate (MDI, Fu-Pao Chemical Co.) and 208 g of dimethylformamide (DMF, C-ECHO Co.) were added to a 500 ml three-neck glass reactor and uniformly stirred using a two-impeller stir bar at 80-140° C. After cooling to room temperature, a halogen-free and phosphorus-free resin formulation was prepared. A glass fiber cloth was then impregnated with the resin formulation to form a pre-preg. The pre-preg was then stacked, heated at 200° C. and pressurized for 3 hours. A halogen-free and phosphorus-free composite material with a low dielectric constant and flame resistance was prepared.

Example 5

Preparation of the Halogen-Free and Phosphorus-Free Composite Material with a Low Dielectric Constant and Flame Resistance (5)

100 g of trimellitic anhydride (TMA, Fu-Pao Chemical Co.), 12.5 g of styrene maleic anhydride (SMA3000F, Cray Valley Co.), 134.5 g of methylene diphenyl diisocyanate (MDI, Fu-Pao Chemical Co.) and 247 g of dimethylformamide (DMF, C-ECHO Co.) were added to a 500 ml three-neck glass reactor and uniformly stirred using a two-impeller stir bar at 80-140° C. After cooling to room temperature, a halogen-free and phosphorus-free resin formulation was prepared. A glass fiber cloth was then impregnated with the resin formulation to form a pre-preg. The pre-preg was then stacked, heated at 200° C. and pressurized for 3 hours. A halogen-free and phosphorus-free composite material with a low dielectric constant and flame resistance was prepared.

Example 6

Preparation of the Halogen-Free and Phosphorus-Free Composite Material with a Low Dielectric Constant and Flame Resistance (6)

30 g of trimellitic anhydride (TMA, Fu-Pao Chemical Co.), 240 g of styrene maleic anhydride (SMA3000F, Cray Valley Co.), 30 g of methylene diphenyl diisocyanate (MDI, Fu-Pao Chemical Co.) and 300 g of dimethylformamide (DMF, C-ECHO Co.) were added to a 500 ml three-neck glass reactor and uniformly stirred using a two-impeller stir bar at 80-140° C. After cooling to room temperature, a halogen-free and phosphorus-free resin formulation was prepared. A glass fiber cloth was then impregnated with the resin formulation to form a pre-preg. The pre-preg was then stacked, heated at 200° C. and pressurized for 3 hours. A halogen-free and phosphorus-free composite material with a low dielectric constant and flame resistance was prepared.

Example 7

Preparation of the Halogen-Free and Phosphorus-Free Composite Material with a Low Dielectric Constant and Flame Resistance (7)

60 g of trimellitic anhydride (TMA, Fu-Pao Chemical Co.), 75 g of styrene maleic anhydride (SMA3000F, Cray Valley Co.), 75 g of methylene diphenyl diisocyanate (MDI, Fu-Pao Chemical Co.) and 210 g of dimethylformamide (DMF, C-ECHO Co.) were added to a 500 ml three-neck glass reactor and uniformly stirred using a two-impeller stir bar at 80-140° C. After cooling to room temperature, a halogen-free and phosphorus-free resin formulation was prepared. A glass fiber cloth was then impregnated with the resin formulation to form a pre-preg. The pre-preg was then stacked, heated at 200° C. and pressurized for 3 hours. A halogen-free and phosphorus-free composite material with a low dielectric constant and flame resistance was prepared.

Example 8

Preparation of the Halogen-Free and Phosphorus-Free Composite Material with a Low Dielectric Constant and Flame Resistance (8)

20 g of trimellitic anhydride (TMA, Fu-Pao Chemical Co.), 110 g of styrene maleic anhydride (SMA3000F, Cray Valley Co.), 70 g of methylene diphenyl diisocyanate (MDI, Fu-Pao Chemical Co.) and 200 g of dimethylformamide (DMF, C-ECHO Co.) were added to a 500 ml three-neck glass reactor and uniformly stirred using a two-impeller stir bar at 80-140° C. After cooling to room temperature, a halogen-free and phosphorus-free resin formulation was prepared. A glass fiber cloth was then impregnated with the resin formulation to form a pre-preg. The pre-preg was then stacked, heated at 200° C. and pressurized for 3 hours. A halogen-free and phosphorus-free composite material with a low dielectric constant and flame resistance was prepared.

Example 9

Preparation of the Halogen-Free and Phosphorus-Free Composite Material with a Low Dielectric Constant and Flame Resistance (9)

100 g of cyclohexane-1,2,4-tricarboxylic acid-1,2-anhydride (c-TMA, Fu-Pao Chemical Co.), 100 g of styrene maleic anhydride (SMA3000F, Cray Valley Co.), 155.4 g of methylene diphenyl diisocyanate (MDI, Fu-Pao Chemical Co.) and 355.4 g of dimethylformamide (DMF, C-ECHO Co.) were added to a 500 ml three-neck glass reactor and uniformly stirred using a two-impeller stir bar at 80-140° C. After cooling to room temperature, a halogen-free and phosphorus-free resin formulation was prepared. A glass fiber cloth was then impregnated with the resin formulation to form a pre-preg. The pre-preg was then stacked, heated at 200° C. and pressurized for 3 hours. A halogen-free and phosphorus-free composite material with a low dielectric constant and flame resistance was prepared.

Example 10

Preparation of the Halogen-Free and Phosphorus-Free Composite Material with a Low Dielectric Constant and Flame Resistance (10)

100 g of trimellitic anhydride (TMA, Fu-Pao Chemical Co.), 100 g of styrene maleic anhydride (SMA3000F, Cray Valley Co.), 155.4 g of isophorone diisocyanate (IPDI, Fu-Pao Chemical Co.) and 355.4 g of dimethylformamide (DMF, C-ECHO Co.) were added to a 500 ml three-neck glass reactor and uniformly stirred using a two-impeller stir bar at 80-140° C. After cooling to room temperature, a halogen-free and phosphorus-free resin formulation was prepared. A glass fiber cloth was then impregnated with the resin formulation to form a pre-preg. The pre-preg was then stacked, heated at 200° C. and pressurized for 3 hours. A halogen-free and phosphorus-free composite material with a low dielectric constant and flame resistance was prepared.

Comparative Example 1

Preparation of Conventional Halogen-Free and Phosphorus-Free Material with a Low Dielectric Constant and Flame Resistance 110 g of amideimide resin (AIN, Fu-Pao Chemical Co.), 67.3 g of epoxy resin (828EL, Shell Chemical Co.) and 13.3 g of dimethylformamide (DMF, C-ECHO Co.) were added to a 500 ml three-neck glass reactor and uniformly stirred using a two-impeller stir bar at 120° C. After cooling to room temperature, 13.3 g of 4,4-diaminodiphenyl sulfone (DDS, Ciba Chemical Co.) was added to the glass reactor and stirred. A halogen-free and phosphorus-free resin formulation was prepared. A glass fiber cloth was then impregnated with the resin formulation to form a pre-preg. The pre-preg was then stacked, heated at 200° C. and pressurized for 3 hours. A halogen-free and phosphorus-free material with a low dielectric constant and flame resistance was prepared.

Comparative Example 2

Preparation of Conventional Halogen-Free and Phosphorus-Free Material with Flame Resistance 110 g of amideimide resin (AIN, Fu-Pao Chemical Co.), 67.3 g of epoxy resin (828EL, Shell Chemical Co.) and 13.3 g of dimethylformamide (DMF, C-ECHO Co.) were added to a 500 ml three-neck glass reactor and uniformly stirred using a two-impeller stir bar at 120° C. After cooling to room temperature, 13.3 g of 4,4-diaminodiphenyl sulfone (DDS, Ciba Chemical Co.) and 114 g of aluminum hydroxide (Al(OH)$_3$, Showa Denko Co.) were added to the glass reactor and stirred. A halogen-free and phosphorus-free resin formulation with flame resistance was prepared. A glass fiber cloth was then impregnated with the resin formulation to form a pre-preg. The pre-preg was then stacked, heated at 200° C. and pressurized for 3 hours. A halogen-free and phosphorus-free material with flame resistance was prepared.

In Table 1, the data (for example Dk and Tg) were obtained from the resin material of the impregnated glass fiber cloth.

TABLE 1

| | TMA (g) | c-TMA (g) | SMA (g) | MDI (g) | IPDI (g) | AlN (g) | 828EL (g) | DDS (g) | Al(OH)₃ (g) | Dk | Tg (°C.) | CTE (ppm/°C.) | UL-94 |
|---|---|---|---|---|---|---|---|---|---|---|---|---|---|
| Example 1 | 100 | X | 25 | 137.5 | X | X | X | X | X | 3.9 | 211 | 53 | V0 |
| Example 2 | 100 | X | 100 | 155.4 | X | X | X | X | X | 3.6 | 186 | 57 | V0 |
| Example 3 | 100 | X | 25 | 375 | X | X | X | X | X | 4.2 | 197 | 58 | V0 |
| Example 4 | 100 | X | 25 | 83.3 | X | X | X | X | X | 3.7 | 191 | 59 | V0 |
| Example 5 | 100 | X | 12.5 | 134.5 | X | X | X | X | X | 4.0 | 206 | 54 | V0 |
| Example 6 | 30 | X | 240 | 30 | X | X | X | X | X | 3.6 | 181 | 59 | V0 |
| Example 7 | 60 | X | 75 | 75 | X | X | X | X | X | 3.7 | 196 | 56 | V0 |
| Example 8 | 20 | X | 110 | 70 | X | X | X | X | X | 3.8 | 189 | 59 | V0 |
| Example 9 | X | 100 | 100 | 155.4 | X | X | X | X | X | 3.9 | 186 | 59 | V0 |
| Example 10 | 100 | X | 100 | X | 155.4 | X | X | X | X | 4.0 | 181 | 60 | V0 |
| Com. Example 1 | X | X | X | X | X | 110 | 67.3 | 13.3 | X | 4.8 | 165 | 58 | V1 |
| Com. Example 2 | X | X | X | X | X | 110 | 67.3 | 13.3 | 114 | 5.1 | 168 | 45 | V0 |

Dk: dielectric constant; Tg: glass transition temperature; CTE: coefficient of thermal expansion; glass fiber cloth 7628

The physical properties of the resin materials prepared from Examples 1-10 and Comparative Examples 1-2 are shown in Table 1.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A halogen-free and phosphorus-free resin formulation, prepared by the following method:
   mixing a carboxy anhydride derivative, diisocyanate, a styrene maleic anhydride (SMA) copolymer derivative and a solvent to form a mixture, wherein the carboxy anhydride derivative has a weight ratio of 10-48 parts by weight, the diisocyanate has a weight ratio of 10-75 parts by weight, and the styrene maleic anhydride (SMA) copolymer derivative has a weight ratio of 5-80 parts by weight, based on 100 parts by weight of the solid content of the mixture; and
   heating the mixture to form a resin formulation.

2. The halogen-free and phosphorus-free resin formulation as claimed in claim 1, wherein the carboxy anhydride derivative is represented by the following formula:

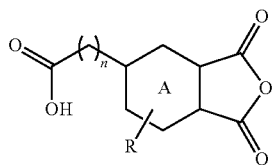

wherein A is benzene or cyclohexane, R is H, CH₃ or COOH, and n is 0-8.

3. The halogen-free and phosphorus-free resin formulation as claimed in claim 1, wherein the diisocyanate comprises methylene diphenyl diisocyanate (MDI), toluene diisocyanate (TDI) or isophorone diisocyanate (IPDI).

4. The halogen-free and phosphorus-free resin formulation as claimed in claim 1, wherein the styrene maleic anhydride (SMA) copolymer derivative is represented by the following formula:

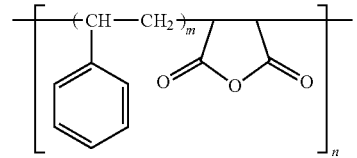

wherein m is 1-7 and n is 2-15.

5. The halogen-free and phosphorus-free resin formulation as claimed in claim 1, wherein the solvent comprises dimethyl formamide (DMF), N-methyl-2-pyrrolidone (NMP) or dimethyl sulfoxide (DMSO).

6. The halogen-free and phosphorus-free resin formulation as claimed in claim 1, wherein the mixture is heated at 80-140° C.

7. A halogen-free and phosphorus-free composite material with a low dielectric constant and flame resistance, prepared by the following method:
   providing a halogen-free and phosphorus-free resin formulation as claimed in claim 1;
   impregnating a fiber with the resin formulation; and
   hardening the fiber by heating to prepare a halogen-free and phosphorus-free composite material with a low dielectric constant and flame resistance.

8. The halogen-free and phosphorus-free composite material with a low dielectric constant and flame resistance as claimed in claim 7, wherein the fiber comprises glass fiber cloth or polyamide fiber.

* * * * *